Patented Dec. 1, 1942

2,304,013

UNITED STATES PATENT OFFICE 2,304,013

PRESERVATIVE COMPOSITION

Frederick H. Norton, Midland, Mich., assignor to The Dow Chemical Company, Midland, Mich., a corporation of Michigan No Drawing. Application March 27, 1941, Serial No. 385,473

12 Claims. (Cl. 167—38.7)

This invention relates to preservative compositions and is particularly concerned with liquid concentrates comprising chloro-phenols and triaryl phosphates and adapted to be dissolved in petroleum distillate or other suitable solvent to form wood treatment solutions.

The treatment of wood products with synthetic organic chemicals to provide protection against fungi, borer, and termite attack is common practice. In many instances the active toxicant is dissolved in a relatively volatile organic solvent and the wooden article dipped in or impregnated with the treating solution. When a crystalline toxicant is employed, the subsequent evaporation of the solvent frequently leaves a visible residue or bloom of crystalline preservative which is objectionable in appearance, toxic to those handling the treated articles, and readily dusted from the treated surface.

The chloro-phenols are widely employed in the treatment of such wooden products as sash, finish lumber, trim, and the like. The chloro-phenols as a class are relatively high-melting products and some, such as pentachloro-phenol, tetrachloro-phenol, trichloro-phenol, and the like, tend to sublime. When such compounds are employed in volatile-base wood treatment compositions, crystalline residues are left upon the surfaces treated. Furthermore, even though deposited substantially below the treated surface by impregnation, these compounds sublime out and crystallize on the surface to form objectionable residues. A further disadvantage in the use of these phenolic derivatives resides in the difficulty encountered in preparing solutions thereof in the solvents common to the wood treating art. Thus, it is frequently necessary to heat these phenols with volatile, explosive, and flammable organic carriers, such as petroleum naphtha, in order to accomplish solution. This practice constitutes a hazard which materially limits the extent to which the chloro-phenols are employed in wood treatment.

According to the present invention the foregoing disadvantages are obviated by dissolving the solid chlorophenol or mixture of chloro-phenols in a triaryl phosphate to form a liquid concentrate. Such concentrate is more readily soluble in hydrocarbon and wood tar oils than the chloro-phenol alone and in many instances is miscible in all proportions with the petroleum distillates commonly employed in wood treating. The phenolic residues from treatment with dilute solutions of such concentrates have been found not to bloom on wooden surfaces and to be unusually effective in the control of wood parasites.

The solid chloro-phenols which have been found particularly valuable in the compositions with which the present invention is concerned are pentachloro-phenol, 2.3.4.6-tetrachloro-phenol, 2.4.6-trichloro-phenol, 2.4.5-trichloro-phenol, and 2-phenyl-4-chloro-phenol. Preferred phosphates are triphenyl phosphate and tricresyl phosphate, although other related compounds may be used. A non-blooming composition miscible with such common solvents as petroleum distillate and fuel oil is obtained when the phenol is dissolved in sufficient of the phosphate that the ultimate concentrate has a freezing point of 20° C. or below.

The exact amounts of the chloro-phenol and triaryl phosphate employed vary with the particular compounds concerned. For example, the melting together of from about 150 to 200 parts by weight of triphenyl phosphate and 100 parts of pentachloro-phenol gives concentrates having the desired solubility and "anti-bloom" characteristics and melting at 20° C. or lower. Similarly, from 100 to 170 parts by weight of the phosphate dissolve 100 parts of 2.3.4.6-tetrachloro-phenol to form satisfactory compositions. With 2.4.6-trichloro-phenol, from 85 to 200 parts by weight of phosphate per 100 parts of phenol are required. With 100 parts of 2-phenyl-4-chloro-phenol, 190 parts or higher of the phosphate are required. When mixtures of two or more of the chloro-phenols are employed, the amounts of phosphate required vary over wide ranges but are generally somewhat lower than when a single phenol is concerned. Concentrates of much lower freezing point are obtainable when such mixed phenols are employed, and this modification of the invention constitutes a preferred embodiment.

In preparing the new concentrates, the required amounts of chloro-phenol and triaryl phosphate are warmed together and stirred to form clear homogeneous solutions which remain free-flowing and mobile on cooling. Such a concentrate may be diluted with any suitable miscible solvent to obtain treating compositions, preferably comprising from 1 to 10 per cent of the phenolic constituent. While not essential, other germicidal and fungicidal materials may be incorporated with the concentrate, as well as organic solvents, such as diacetone alcohol, methylethyl ketone, and the like.

The following examples are not to be construed as limiting the invention:

EXAMPLE 1

2.5 parts by weight of mixed 2-phenyl-monochloro-phenols, 1.5 parts of pentachloro-phenol, 1 part of 2.3.4.6-tetrachloro-phenol, and 2 parts of triphenyl phosphate were warmed together to obtain a liquid concentrate which was cooled to below 5° C. without freezing or depositing crystals. 7 parts by weight of this concentrate was stirred into 93 parts by weight of a petroleum distillate boiling at 283°–360° F. and having a flash point by the closed cup method of 82° F.

The concentrate passed into solution readily without heating to form a clear treating product containing 5 per cent by weight of phenolic constituents. Samples of window sash were immersed in this product for 3 minutes and thereafter dried. The surfaces of the dipped and dried articles did not show "blooming" of the crystalline preservatives and were resistant to both fungus and insect attack.

EXAMPLE 2

4 parts by weight of pentachloro-phenol, 2 parts of 2.3.4.6-tetrachloro-phenol, and 0.25 part of 2.4.6-trichloro-phenol were fused together with stirring. 51 parts by weight of this mixture was warmed and stirred with 49 parts of triphenyl phosphate to obtain a liquid preservative concentrate which was cooled to 0° C. without depositing crystals. This composition was adapted to be diluted with petroleum distillate to produce a solution for dipping wooden articles substantially as described in Example 1.

EXAMPLE 3

Equal parts by weight of 2.4.6-trichloro-phenol and 2.3.4.6-tetrachloro-phenol were mixed together. 50 parts by weight of this mixture was warmed with 50 parts of triphenyl phosphate to form a liquid concentrate which was cooled to below —20° C. without freezing or depositing crystals. 86 parts of this phenol mixture melted and stirred with 14 parts of triphenyl phosphate gave a concentrate having a freezing point of 20° C. or lower. 38 parts of the phenol mixture compounded with 62 parts of triphenyl phosphate also gave a concentrate freezing at 20° C. or lower. Each of these liquid concentrates was adapted to be employed in the preparation of "non-blooming" wood treating solutions substantially as described in Example 1.

EXAMPLE 4

In a similar manner other solid chloro-phenols and phenol mixtures were dissolved in triaryl phosphates to obtain liquid preservative compositions of which the following are representative:

*Composition 1*

| | Parts by weight |
|---|---|
| Pentachloro-phenyl | 40 |
| Triphenyl phosphate | 60 |

This composition has a freezing point of 20° C. or lower.

*Composition 2*

| | Parts by weight |
|---|---|
| Penetachloro-phenol | 33 |
| Triphenyl phosphate | 67 |

This composition has a freezing point of 20° C. or lower.

*Composition 3*

| | Parts by weight |
|---|---|
| Pentachloro-phenol | 47 |
| Tricresyl phosphate | 53 |

This composition was cooled to below 10° C. without depositing crystals.

*Composition 4*

| | Parts by weight |
|---|---|
| 2.3.4.6-tetrachloro-phenol | 50 |
| Triphenyl phosphate | 50 |

This composition has a freezing point of 20° C. or lower.

*Composition 5*

| | Parts by weight |
|---|---|
| 2.3.4.6-tetrachloro-phenol | 37 |
| Triphenyl phosphate | 63 |

This composition has a freezing point of 20° C. or lower.

*Composition 6*

| | Parts by weight |
|---|---|
| 2.4.5-trichloro-phenol | 57 |
| Triphenyl phosphate | 43 |

This composition has a freezing point of 20° C. or lower.

*Composition 7*

| | Parts by weight |
|---|---|
| 2.4.6-trichloro-phenol | 54 |
| Triphenyl phosphate | 46 |

This composition has a freezing point of 20° C. or lower.

*Composition 8*

| | Parts by weight |
|---|---|
| 2.4.6-trichloro-phenol | 33 |
| Triphenyl phosphate | 67 |

This composition has a freezing point of 20° C. or lower.

*Composition 9*

| | Parts by weight |
|---|---|
| 2.4.6-trichloro-phenol | 45 |
| Triphenyl phosphate (still residue) | 55 |

This composition was cooled to below —15° C. without depositing crystals.

*Composition 10*

| | Parts by weight |
|---|---|
| 2-phenyl-4-chloro-phenol | 8 |
| 2-phenyl-6-chloro-phenol | 32 |
| Triphenyl phosphate | 60 |

This composition was cooled to below —20° C. without depositing crystals.

*Composition 11*

| | Parts by weight |
|---|---|
| 2-phenyl-4-chloro-phenol | 34 |
| Triphenyl phosphate | 66 |

This composition has a freezing point of 20° C. or lower.

*Composition 12*

| | Parts by weight |
|---|---|
| 2-phenyl-4-chloro-phenol | 29 |
| Triphenyl phosphate | 71 |

This composition has a freezing point of 20° C. or lower.

Each of the foregoing compositions is liquid at temperatures above 20° C. and is readily soluble in the organic solvents commonly employed in wood dipping and impregnation. These concentrates, when diluted with such solvents, may be employed for treating wood or wooden articles. The treated and dried surfaces so obtained are protected against attack by fungi and insects and do not "bloom."

Other triaryl phosphates which may be employed substantially as set forth above are diphenyl-2-xenyl phosphate, di-(2-xenyl)-phenyl phosphate, (5-tertiarybutyl-2-xenyl)-di-(4-tertiarybutyl-phenyl) phosphate, diphenyl-(2-chloro-phenyl) phosphate, dicresyl-(2-chloro-phenyl) phosphate, dicresyl-phenyl phosphate, etc.

I claim:

1. A wood preservative comprising a solid chloro-phenol dissolved in sufficient of a triaryl phosphate that the freezing point of the phenol-phosphate solution is below 20° C.

2. A liquid preservative concentrate comprising as a major constituent a solution of a solid chloro-phenol in sufficient of a triaryl phosphate that the freezing point of the solution is below 20° C.

3. A wood preservative comprising a solid chloro-phenol dissolved in sufficient triphenyl phosphate that the freezing point of the phenol-phosphate solution is below 20° C.

4. A liquid preservative concentrate comprising as a major constituent a solution of a solid chloro-phenol in sufficient triphenyl phosphate that the freezing point of the solution is below 20° C.

5. A wood preservative comprising a member of the group consisting of pentachloro-phenol, 2.3.4.6-tetrachloral-phenol, 2.4.5-trichloro-phenol, 2.4.6-trichloro-phenol, and 2-phenyl-4-chloro-phenol dissolved in sufficient of a triaryl phosphate that the freezing point of the resulting phenol-phosphate solution is below 20° C.

6. A wood preservative comprising a member of the group consisting of pentachloro-phenol, 2.3.4.6-tetrachloro-phenol, 2.4.5-trichloro-phenol, 2.4.6-trichloro-phenol, and 2-phenyl-4-chloro-phenol dissolved in sufficient triphenyl phosphate that the freezing point of the phenol-phosphate solution is below 20° C.

7. A liquid preservative concentrate comprising as a major constituent a solution of a member of the group consisting of pentachloro-phenol, 2.3.4.6-tetrachloro-phenol, 2.4.5-trichloro-phenol, 2.4.6-trichloro-phenol, and 2-phenyl-4-chloro-phenol dissolved in sufficient of a triaryl phosphate that the freezing point of the solution is below 20° C.

8. A liquid preservative concentrate comprising as a major constituent a solution of a member of the group consisting of pentachloro-phenol, 2.3.4.6-tetrachloro-phenol, 2.4.5-trichloro-phenol, 2.4.6-trichloro-phenol, and 2-phenyl-4-choloro-phenol dissolved in sufficient triphenyl phosphate that the freezing point of the solution is below 20° C.

9. A wood preservative comprising a mixture of at least two of the group consisting of penta-chloro-phenol, 2.3.4.6-tetrachloro-phenol, 2.4.5-trichloro-phenol, 2.4.6-trichloro-phenol, and 2-phenyl-4-chloro-phenol dissolved in sufficient of a triaryl phosphate that the freezing point of the phenol-phosphate solution is below 20° C.

10. A wood preservative comprising a mixture of at least two of the group consisting of penta-chloro-phenol, 2.3.4.6-tetrachloro-phenol, 2.4.5-trichloro-phenol, 2.4.6-trichloro-phenol, and 2-phenyl-4-chloro-phenol dissolved in sufficient triphenyl phosphate that the freezing point of the phenol-phosphate solution is below 20° C.

11. A liquid preservative concentrate comprising as a major constituent a solution of at least two of the group consisting of pentachloro-phenol, 2.4.5.6-tetrachloro-phenol, 2.4.5-trichloro-phenol, 2.4.6-trichloro-phenol, and 2-phenyl-4-chloro-phenol dissolved in sufficient of a triaryl phosphate that the freezing point of the resulting composition is below 20° C.

12. A liquid preservative concentrate comprising as a major constituent a solution of at least two of the group consisting of pentachloro-phenol, 2.4.5.6-tetrachloro-phenol, 2.4.5-trichloro-phenol, 2.4.6-trichloro-phenol, and 2-phenyl-4-chloro-phenol dissolved in sufficient of a triphenyl phosphate that the freezing point of the resulting composition is below 20° C.

FREDERICK H. NORTON.